United States Patent
Krishnaswany (10) Patent No.: US 8,600,037 B2
(45) Date of Patent: Dec. 3, 2013

(54) AUDIO QUALITY AND DOUBLE TALK PRESERVATION IN ECHO CONTROL FOR VOICE COMMUNICATIONS

(75) Inventor: Arvindh Krishnaswany, San Jose, CA (US)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 13/486,403

(22) Filed: Jun. 1, 2012

(65) Prior Publication Data

US 2012/0307980 A1 Dec. 6, 2012

Related U.S. Application Data

(60) Provisional application No. 61/493,363, filed on Jun. 3, 2011.

(51) Int. Cl.
*H04M 9/08* (2006.01)

(52) U.S. Cl.
USPC .............. 379/406.03; 379/406.05; 379/406.1; 704/223; 704/226; 704/243; 704/277; 381/71.1; 381/71.9

(58) Field of Classification Search
USPC ......... 379/3, 406.01, 406.03, 406.05, 406.06, 379/406.1, 406.11, 406.12; 704/223, 226, 704/227, 233, 237, 243; 381/71.1, 71.9
See application file for complete search history.

(56) References Cited

U.S. PATENT DOCUMENTS

| | | | | |
|---|---|---|---|---|
| 5,646,990 A | * | 7/1997 | Li | 379/406.08 |
| 5,924,065 A | * | 7/1999 | Eberman et al. | 704/231 |
| 6,173,058 B1 | * | 1/2001 | Takada | 381/66 |
| 7,995,745 B1 | * | 8/2011 | Parry | 379/406.04 |
| 8,081,753 B2 | * | 12/2011 | Mohammad et al. | 379/406.08 |
| 8,385,558 B2 | * | 2/2013 | Prakash et al. | 381/71.1 |
| 8,422,663 B1 | * | 4/2013 | Parry | 379/406.07 |
| 2008/0118055 A1 | * | 5/2008 | Otani et al. | 379/406.12 |

* cited by examiner

Primary Examiner — Binh Tieu
(74) Attorney, Agent, or Firm — Blakely, Sokoloff, Taylor & Zafman LLP (57) ABSTRACT

Echo cancellation is handled using a pattern classification technique. During a training phase, the communications device is trained to learn patterns of signal inputs that correspond to certain communication modes. After numerous different patterns have been classified by mode, the classified patterns are used during real-time use of the communications device in order to determine, dynamically, the mode in which the communications device is currently operating. The communications device may then apply, to the microphone-produced signal, a suppression action.

25 Claims, 4 Drawing Sheets

AUDIO QUALITY AND DOUBLE TALK PRESERVATION IN ECHO CONTROL FOR VOICE COMMUNICATIONS

CROSS-REFERENCE TO RELATED APPLICATIONS; BENEFIT CLAIM

This application claims the benefit of Provisional Appln. 61/493,363, filed Jun. 3, 2011, the entire contents of which is hereby incorporated by reference as if fully set forth herein, under 35 U.S.C. §119(e).

FIELD OF THE INVENTION

The present invention relates to a technique for removing echo from an audio signal.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A problem often arises in two-way communications. A person may be communicating with someone else using a communications device, such as a laptop computer or mobile telephone, which have both microphones and loudspeakers. These components may be built-in to the communications device. While the person is communicating using such a device, echo may become a problem. The sound that is emitted from the loudspeaker is picked up by the microphone and is transmitted back to the party that produced the sound. Thus, the person on the opposite end of the communication channel hears himself speaking. This is an undesirable result. Ideally, the person on the opposite end of the communication channel would hear only the person on the near end of the communication channel speaking, without any echo.

In order to combat this problem, echo control techniques are sometimes used within communications devices. These techniques take advantage of the fact that the communications device can observe the audio signal being played back by the device's loudspeaker. This isolated audio signal is referred to as the "reference signal." The communications device attempts to identify the echo produced by the reference signal within the incoming audio signal that is being received by the device's microphone—but, as will be learned from the discussion below, this attempt is imperfect. After identifying the echo within the incoming audio signal, the communications device attempts, though imperfectly, to filter it out of the incoming audio signal so that only incoming sound other than the echo remains within the incoming audio signal. After attempting, though imperfectly, to filter the incoming audio signal in this manner, the communications device sends the imperfectly filtered audio signal on to the person on the far end of the communication channel. In this manner, the communications device attempts, imperfectly, to remove the undesired echo from the audio signal.

Attempting to remove echo from the audio signal is difficult, and this difficulty leads to the imperfection in existing echo control techniques. The reference signal is a "clean" digital signal prior to being played out of the communications device's loudspeaker. However, after the reference signal passes through the device's electronics (digital and analog) hardware and causes the usually tiny loudspeakers to produce sound, the sound ends up being a highly distorted representation of the information that the reference signal actually carried. In real life, in actual systems, the loudspeaker rattles, vibrates, saturates, and heats up, thereby distorting the loudspeaker's sound output. Consequently, the loudspeaker's output sound is not truly a linearly transformed product of the reference signal. Moreover, in modern, mobile devices, the placement of the loudspeaker(s) and microphone(s) is usually non-ideal—they are very close to each other physically. This leads to the echo being much stronger than the desired local voice signal level. Unfortunately, existing echo control techniques do not deal well with these aforementioned scenarios. These techniques, which borrow heavily from linear system concepts such as correlation, coherence or wiener filtering, work reasonably well with linear systems and weakly-non-linear systems. But they break down and perform poorly when faced with highly non-linear echo that are also much louder than the local voice. The symptoms of failure of existing solutions include poor double talk performance and/or audible echo on the far side.

The input signal being received by the communication device's microphone potentially represents, at least partially, the speech of the communication device's user. The input signal also may include information that represents sound that the microphone is picking up from the device's loudspeaker—the echo. A linear echo canceller attempts to remove, from the input signal being received by the communications device's microphone, the information that the echo canceller can deduce from the known reference signal. However, because the loudspeaker sound being picked up by the microphone is not truly a linearly transformed representation of the reference signal, this removal is imperfect and leaves non-linear artifacts of the echo within the input signal. These artifacts end up being transmitted along with the speech of the communications device's user to the person on the far end of the communication channel.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Echo cancellation is handled using a pattern classification technique. During a training phase, various signal values are measured at various points in a communication device's system in order to classify a pattern. These various signal values are measured while typical speech signals (potentially pre-recorded) are being simulated to the device. During the training phase, the current mode—"echo only," "local voice only," or "double talk"—corresponding to the speech currently being simulated is known. The identity of the current mode also may be supplied as input to the pattern classifier. Thus, during the training phase, the communications device is trained to learn patterns of signal inputs that correspond to certain communication modes. In one embodiment of the invention, the patterns and their associated classifications, or modes, are stored in a database that resides within memory of the communication device.

After numerous different patterns have been classified by mode in the manner described above, the classified patterns are used during real-time use of the communications device in order to determine, dynamically, the mode in which the communications device is currently operating. The communications device measures, in real-time during an actual communication session, signal values at the same various points in the system. The communications device then dynamically matches the signal pattern to a particular pattern that was previously stored in the database during the training phase. The communications device determines the communications mode in which the device is currently operating by reading the mode that is mapped to the matching pattern in the database. The communications device may then apply, to the microphone-produced signal, a suppression action that is appropriate for the currently active communications mode—a suppression action that is calculated to eliminate, substantially, linear and non-linear echo in the signal, while preserving as much of the remaining information in the signal as possible.

Example Echo-Cancelling System

Figure 1:
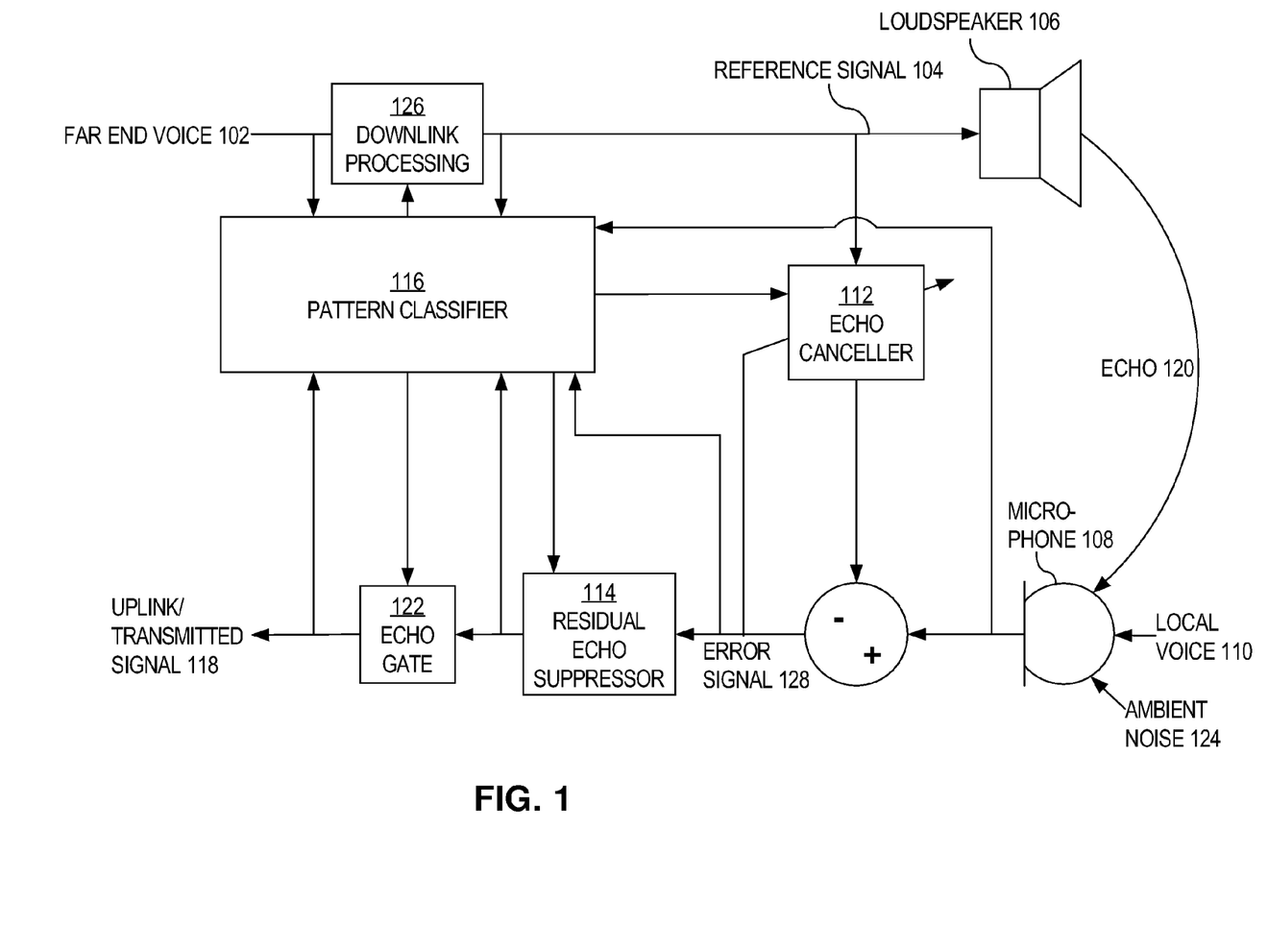
FIG. 1 is a block diagram that illustrates an example system for cancelling echo, according to an embodiment of the invention.

FIG. 1 is a block diagram that illustrates an example system for cancelling echo, according to an embodiment of the invention. An audio signal is received by a communications device, such as a laptop computer or mobile telephone. The audio signal contains information representing the voice of the person at the far end of the two-way communications channel—the person with whom the user of the communications device is communicating over the channel. The voice of the person at the far end of the channel is shown in FIG. 1 as far end voice 102. The information representing far end voice 102 is carried on reference signal 104, which is received by the communications device (e.g., over the Internet or some other packetized network). The communications device routes reference signal 104 to loudspeaker 106 (of the device), which produces sound that represents far end voice 102. However, due to various imperfections in loudspeaker 106, this sound is distorted such that the sound does not truly represent a linear transform of reference signal 104. Although the discussion herein refers to a single loudspeaker 106 for sake of simplicity, embodiments of the invention are applicable and scalable to systems that include multiple speakers and/or other audio outputs.

At least some of the sound produced by loudspeaker 106—potentially including sound that has refracted off of walls and other objects after being produced by loudspeaker 106—is picked up by microphone 108 (of the device) in the form of echo 120. Echo 120 includes linear echo, non-linear echo, and time-varying echo. Microphone 108 also receives sound that represents local voice 110. Local voice 110 is the voice of the user of the communications device—the user who is communicating over the communications channel with the person at the far end. Ideally, as a result of the application of the echo cancellation technique, the person at the far end of the communications channel will hear all of local voice 110 and none of echo 120. Although the discussion herein refers to a single microphone 108 for sake of simplicity, embodiments of the invention are applicable and scalable to systems that include multiple microphones and/or other audio inputs. According to various embodiments of the invention, microphones may be located in different locations proximate to each other and to speakers on the communications device, depending on the particular configuration of the communications device. Additionally, speakers may be located in different locations proximate to each other and to microphones on the communications device, depending on the particular configuration of the communications device. Embodiments of the invention are applicable to various communications device with various microphone and speaker configurations; embodiments of the invention are not limited to any one particular configuration of microphones and speakers. Furthermore, embodiments of the invention are applicable even to communications devices in which microphones and speakers are not located very close together; it should not be inferred that embodiments of the invention described herein are only applicable to communications devices in which at least one microphone is located closely to at least one speaker.

At any given time during two-way communications, if the signal produced by microphone 108 is not completely silent, then that signal may represent (a) echo 120 only, (b) local voice 110 only, or (c) some mixture of echo 120 and local voice 110, which is referred to as "double talk." At times during which local voice 110 is absent (due to the user of the communication device not speaking at that moment) but far end voice 102 is present—the "echo only" scenario—all of the sound received by microphone 108 is echo 120 that should be suppressed. At times during which local voice 110 is present, but far end voice 102 is absent (due to the person at the far end of the communication channel not speaking at that moment)—the "local voice only" scenario—none of the sound received by microphone 108 is echo 120 that should be suppressed. At times during which some extent of far end voice 102 and local voice 110 are both present—the "double talk" scenario—the situation is murkier. In the double talk scenario, the sounds received by microphone 108 from loudspeaker 106 and local voice 110 may at least partially overlap in time and frequency.

Echo canceller 112 is a linear echo canceller. Echo canceller 112 receives reference signal 104 as input. Echo canceller 112 causes the information represented within reference signal 104, or some linear transformation of that information, to be subtracted out from the echo-containing signal produced by microphone 108. The subtraction of that information or the linear transformation thereof removes the linear portion of echo 120 from the signal produced by microphone 108. The signal from which the information has been subtracted is transmitted from the communications device (e.g., over the Internet or some other packet network) in the form of transmitted signal 118. Typically, transmitted signal 118 is transmitted toward a communications device being operated by the person at the far end of the communication channel.

Echo canceller 112 attempts to learn, over time, the linear system to which it needs to evolve its filters in order to cancel the linear portion of echo 120. In order to facilitate this learning, echo canceller 112 reads the signal that resulted from the subtraction of the linear portion of echo 120. If the current scenario is known to be the "echo only" scenario, and if the signal read by echo canceller 112 is zero, then echo canceller 112 realizes that echo canceller 112 has achieved the desired goal of echo cancellation. Alternatively, if the current scenario is known to be the "echo only" scenario, but if the signal read by echo canceller 112 is not zero, then echo canceller 112 realizes that echo canceller 112 has not fully achieved the goal of echo cancellation. In response to detecting that the goal of echo cancellation has not been fully achieved, echo canceller 112 alters some coefficients in its echo cancellation formulae in an attempt to improve echo cancellation in the future. However, echo canceller 112 cannot perform this adaptation while local voice 110 is present, because at times when local voice 110 is present, the signal read by echo canceller 112 is not supposed to be zero; at those times, the signal is supposed to carry information representing local voice 110. Thus, at times when local voice 110 is present, echo canceller 112 freezes or retards adaptation.

Residual echo suppressor 114 also receives reference signal 104 as input. Residual echo suppressor 114 also receives, as input, the echo-containing signal produced by microphone 108. Residual echo suppressor 114 is more aggressive than echo canceller 112. Residual echo suppressor 114 receives input from echo canceller 112. Residual echo suppressor 114 examines statistics that can be obtained from the signals that residual echo suppressor 114 receives as input. Based on these statistics, residual echo suppressor 114 determines that certain selected frequency bands within the signal produced by microphone 108 should be suppressed within certain selected samples taken from that signal. In the "echo-only" scenario, in which there still exists some non-linear echo and/or time-varying echo, residual echo suppressor 114 still causes those forms of echo to be at least partially suppressed. Conversely, in the "local voice only" scenario, residual echo suppressor 114 is sufficiently intelligent to not suppress any frequencies. In the "double-talk" scenario, residual echo suppressor 114 suppresses selected frequencies according to some determined compromise scheme. The compromise scheme may distort local voice 110 to a small extent, but will also eliminate at least some of echo 120. In one embodiment of the invention, residual echo suppressor 114 outputs a signal to echo gate 122. The functionality of echo gate 122 is discussed in greater detail below.

Output from a pattern classifier 116 is used by both echo canceller 112 and residual echo suppressor 114. Furthermore, in one embodiment, pattern classifier 116 controls not only echo canceller and residual echo suppressor 114, but also a downlink processing module 126. In such an embodiment, output from pattern classifier 116 may be used by downlink processing module 126 to improve the input to loudspeaker 106. Input may be improved, for example, by downlink processing module 126 lowering the volume of the signal in "double-talk" scenarios and/or increasing the volume of signal in "echo-only" scenarios. Pattern classifier 116 may include a double-talk detector (DTD). Double-talk detectors are well-known in the art. An example of a double-talk detector is described in "A Double-Talk Detector Based on Coherence" by T. Gansler, M. Hansson, C.-J. Ivarsson, and G. Salomonsson, published in "IEEE Transactions on Communications," vol. 44, no. 11, pp. 1421-1427 (1996), the contents of which are incorporated by reference herein. Echo canceller 112 uses the output from pattern classifier 116 to determine when local voice 110 is present. As is discussed above, while local voice 110 is present, echo canceller 112 freezes or retards the adaptation of its echo-cancelling formulae. Pattern classifier 116 may scale in complexity, limited only by the computational resources required to perform its functions.

Insufficiency of Linear System Concepts to Cancel Non-Linear Echo

Techniques described herein overcome shortcomings that resulted from the erroneous assumption that a two-way communications system behaves linearly. The assumptions work up to a certain point if the actual extent to which a system is linear rather than non-linear is dominant. However, beyond a certain threshold point, a system becomes sufficiently non-linear that the non-linear aspects of the system dominate the linear aspects. Beyond this threshold point, the linear equations used in known echo-cancellation approaches will fail to cancel echo sufficiently well.

For example, although such linear equations may work reasonably well during times at which a loudspeaker's volume is set to a relatively quiet level, those same equations will not work nearly as well during times at which the loudspeaker's volume is set to a level that causes sound output to become more increasingly distorted. At times during which the loudspeaker's volume is set to such a high level, echo 120 will be dominated by the non-linear echo component rather than the linear echo component. Linear equations used in known echo-cancellation approaches are insufficient to cancel non-linear echo.

Pattern Classification-Based Echo Cancellation

According to an embodiment of the invention, echo cancellation is handled using a pattern classification technique. According to one embodiment, pattern classifier 116 examines various signals at various points in the system shown in FIG. 1 in order to classify a pattern. In one embodiment, pattern classifier 116 reads at least (a) reference signal 104, which represents far end voice 102, (b) the "raw" signal produced by microphone 108 prior to any echo cancellation being performed on that signal, (c) the signal produced by the output of echo canceller 112 (after subtraction of reference signal 104 has been performed on the microphone-produced signal, as discussed above), and (d) the signal produced by the first pass of residual echo suppressor 114. This list of points in the system forms just one of many possible examples; other, alternative embodiments of the invention may involve reading different combinations of signals at different points in the system than those expressly discussed above. For example, in one embodiment, pattern classifier 116 reads signals at every location in the system: both the inputs to each system module and the outputs to each system module. If multiple speakers and/or microphones are contained within the communications device, then pattern classifier 116 may read and treat the inputs to and outputs from each one as a separate signal. The combination of measured signal values, potentially measured in multiple samples over a window of time, indicates the pattern that is to be classified.

Pattern classifier 116 reads these various signals while typical speech signals (potentially pre-recorded) are being played as far end voice 102 and local voice 110. In one embodiment, pattern classifier 116 reads these signals while ambient noise 124 is being played as well. Pattern classifier 116 reads the signals at these various system points in (a) "echo only" situations, (b) "local voice only" situations, and (c) "double talk" situations. Pattern classifier 116 reads the signals at these various system points while far end voice 102, local voice 110, and ambient noise 124 are being played at various levels of volume as training data. For example, pattern classifier 116 may read these signals once while far end voice 102 is being played relatively loudly relative to local voice 110, and again while far end voice 102 is being played relatively quietly relative to local voice 110.

Pattern classifier 116 initially reads these signals at various system points during a "training" phase. During the training phase, the current mode—"echo only," "local voice only," or "double talk"—is known. The identity of the current mode also may be supplied as input to echo gate 112 during the training phase. Additionally or alternatively, the precise ratios of far end voice 102 volume to local voice 110 volume may be supplied as input to pattern classifier 116 during the training phase, since these ratios are also known during the training phase. Although local voice 110 cannot be isolated with certainty during real-time use of the communications device (because local voice 110 may be mixed in with other sounds that microphone 108 picks up), local voice 110 can be isolated with certainty during the training phase because the composition of the training data is known during that phase; the exact content of local voice 110, and the precise frequency and volume thereof at any given moment in time, is already known before local voice 110 is played to microphone 108.

Using pattern-recognition and machine-learning techniques, pattern classifier 116 is trained during the training phase to identify the modes ("echo only," "local voice only," or "double talk") that are associated with each set of measured signal points in the system. In situations where the mode is "double talk," the mode may be further refined to specify one or more frequency-by-volume distributions (one for each sample made over a span of time) for both (a) far end voice 102 and (b) local voice 110. Thus, in one embodiment of the invention, there are multiple separate "double talk" modes, each such mode characterized by two sets of frequency-by-volume distribution samples: one set representing samples from far end voice 102 over a window of time, and one set representing samples from local voice 110 over that window of time. Because far end voice 102 and local voice 110 are pre-known during the training phase, these sets of frequency-by-volume distribution samples are known during the training phase also. Thus, in one embodiment of the invention, during the training phase, pattern classifier 116 is trained to learn patterns of signal inputs (i.e., the inputs that pattern classifier 116 reads from the various system points discussed above during the training phase) that correspond to certain modes and to certain sets of frequency-by-volume distributions.

For example, pattern classifier 116 may learn, during the training phase, that a particular set of values (or ranges of values) read at the various system points discussed above corresponds to both (a) a particular set of far end voice frequency-by-volume distribution samples and (b) a particular set of local voice frequency-by-volume distribution samples (both sets having been played concurrently during the training phase at the time in which pattern classifier 116 measured the various system point signals). Essentially, pattern classifier 116 learns to classify patterns of signal inputs read at the various system points as occurring during certain known modes, where those modes (i.e., classifications) may be labeled according to the sets of frequency-by-volume distribution samples for the far end and local voices—the samples being taken from the far end voice and local voice training data that was being played at the times that the patterns were detected. In one embodiment of the invention, the patterns and their associated classifications are stored in a database that resides within memory of the communication device.

In one embodiment of the invention, for each particular combination of a far end voice 102 signal and a local voice 110 signal contained in the training data, the training data further includes an associated range of frequencies (and/or ranges of volumes at various frequencies) that should be suppressed by the echo cancellation system whenever the communication device is operating in the mode characterized by that particular combination of far end voice 102 signal and local voice 110 signal. These ranges may be specified by an administrator who is familiar with the training data and how echoes should be suppressed under various circumstances. Thus, in one embodiment of the invention, for each pattern and classification pair stored in the database, the database also associates, with that pair, a suppression range to be applied to the microphone-produced signal whenever a determination is made that the communication device is operating in the mode corresponding to that classification.

After numerous different patterns have been classified in the manner described above, in one embodiment of the invention, the classified patterns are used during real-time use of the communications device (ideally, the same type of communications device upon which the training was performed) in order to determine, dynamically, the mode in which the communications device is currently operating—the "echo only" mode, the "local voice only" mode, or one of the multiple different "double talk" modes characterized by their respective sets of frequency-by-volume distribution samples. For example, during real-time use of the communication device, during an actual conversation between two people, pattern classifier 116 may measure (potentially in multiple samples over a window of time) values of (a) reference signal 104, which represents far end voice 102, (b) the "raw" signal produced by microphone 108 prior to any echo cancellation being performed on that signal, (c) the signal produced by the output of echo canceller 112 (after subtraction of reference signal 104 has been performed on the microphone-produced signal, as discussed above), and (d) the signal produced by the first pass of residual echo suppressor 114. Pattern classifier 116 may then consult the database (previously populated during the training phase) to locate the pattern that most closely matches the set of measured signals. After locating the matching pattern in the database, pattern classifier 116 determines the classification, or mode, that is mapped to that pattern. The associated mode informs echo gate 122 of the mode in which the device is most probably currently operating—"echo only," "local voice only," or one of the several "double talk" modes, characterized by their associated sets of frequency-by-volume distribution samples.

In one embodiment of the invention, in response to determining the current mode in the manner described above, pattern classifier 116 causes the echo cancellation system (which may include one or more of echo canceller 112, residual echo suppressor 114, and echo gate 122) of the communication device to take some remedial action relative to the signal produced by microphone 108. This remedial action may involve suppressing the microphone-produced signal entirely if the current mode was determined to be the "echo only" mode. Alternatively, this remedial action may involve ensuring that no suppression occurs relative to the microphone-produced signal if the current mode was determined to be the "local voice only" mode.

In one embodiment of the invention, under circumstances in which the current mode was determined to be one of the many different "double talk" modes, echo gate 122 (driven by pattern classifier 116) suppresses, or causes to be suppressed, merely a portion of the microphone-produced signal. For example, for a particular mode, echo gate 122 may suppress a specified range of frequencies within the microphone-produced signal, in an effort to eliminate echo (including non-linear echo). For another example, for a particular mode, for each particular frequency in a specified range of frequencies, echo gate 122 may suppress a different specified range of volumes at that frequency; in one example mode, echo gate 122 may suppress all portions of a microphone-produced signal that are at volumes that are over a first decibel level at a first frequency range (e.g., up to 500 Hz), while all portions of that microphone-produced signal that are at volumes that are over a second, different decibel level at a second, different frequency range (e.g., over 500 Hz to 1 KHz). Such techniques are especially helpful in eliminating non-linear echoes that result from sound distortion. The particular portions of the microphone-produced signal that echo gate 122 decides to suppress may be based on the characteristics of the sets of frequency-by-volume distribution samples that are mapped to the determined mode in the database.

In one embodiment of the invention, in response to a determination by pattern classifier 116 that the communication device is operating in a particular mode (using the pattern-matching technique discussed above), echo gate 122 (driven by pattern classifier 116) suppresses, or causes to be suppressed, portions of the microphone-produced signal that are specified by the remedial action that is mapped to that mode in the database. For example, a particular double-talk mode might be mapped to an action that specifies that a specified range of frequencies in the microphone-produced signal are to be suppressed, while preserving the others. For another example, a particular double-talk mode might be mapped to an action that specifies that, for different specified ranges of frequencies, portions of the microphone-produced signal that occur within different specified decibel levels are to be suppressed, while preserving the remainder of the signal.

Example Flows

Figure 2:
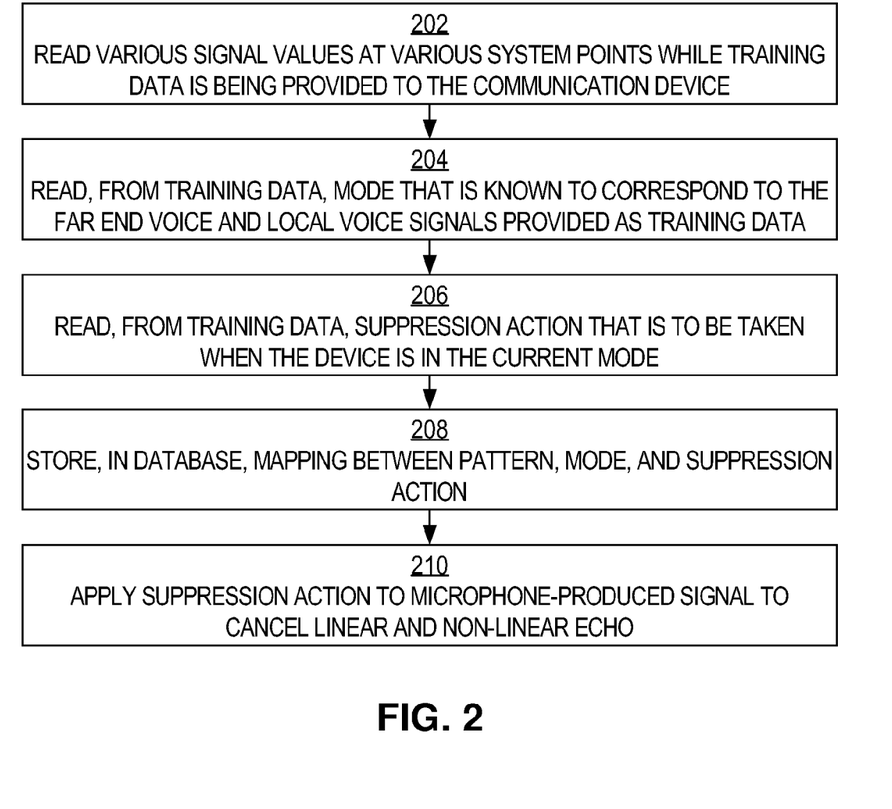
FIG. 2 is a flow diagram that illustrates an example technique for automatically learning, during a training phase, patterns of measured signals that correspond to different communication modes, according to an embodiment of the invention.

FIG. 2 is a flow diagram that illustrates an example technique for automatically learning, during a training phase, patterns of measured signals that correspond to different communication modes, according to an embodiment of the invention. In block 202, while training data (including a far end voice 102 signal and a local voice 110 signal) is being provided to the communications device, pattern classifier 116 reads various signals at various points in the system shown in FIG. 1 in order to classify a pattern. For example, pattern classifier 116 may read at least (a) reference signal 104, which represents far end voice 102, (b) the "raw" signal produced by microphone 108 prior to any echo cancellation being performed on that signal, (c) the signal produced by the output of echo canceller 112 (after subtraction of reference signal 104 has been performed on the microphone-produced signal, as discussed above), and (d) the signal produced by the first pass of residual echo suppressor 114. In an alternative embodiment, pattern classifier 116 reads signals at all points in the system: at the input and output of each module in the system. Together, the combination of signal values, potentially measured at each of several instants during a window of time, forms the pattern.

In block 204, pattern classifier 116 reads, from the training data, the mode that is known to correspond to the current far end voice 102 and local voice 110 signals that were provided to the communications device. For example, pattern classifier 116 may read, from the training data, that the current mode is the double-talk mode that is characterized by a particular set of frequency-by-volume distribution samples for far end voice 102 and a particular set of frequency-by-volume distribution samples for local voice 110. For another example, pattern classifier 116 may read, from the training date, that the current mode is simply either "echo only" or "local voice only."

In block 206, pattern classifier 116 reads, from the training data, the specified suppression action that ought to be taken relative to the microphone-produced signal whenever the current mode is determined to be the communications mode in which the communications device is currently operating. As is discussed above, the suppression action may specify frequency ranges and/or blocks of frequency-by-volume fields that should be suppressed.

In block 208, pattern classifier 116 stores, in a database, a mapping between the pattern, the mode, and the suppression action.

In block 210, echo gate 122 (driven by pattern classifier 116) applies the suppression action to the microphone-produced signal in order to cancel echo, including non-linear echo, at least partially.

The technique described above may be performed separately for each different type of communications device. For example, the technique may be performed for a particular mobile telephone (e.g., an iPhone) and then separately performed for a particular laptop computer (e.g., a MacBook). Although the same sets of training data may be used to train each device, the results of the training may differ on a per-device basis due to differences in the hardware components and configuration of each device. The data learned on one type of communications device, while being applicable to all communications devices of that type, may not be applicable to communications devices of other, different types. Thus, in one embodiment of the invention, each different communications device type is separately trained using the same training data, and a separate database is populated for each different communications device type.

Training does not need to be performed on every communications device of a particular type; once a database has been populated for a particular type of communications device using the technique discussed above, that database may be stored on multiple separate communications devices of that same type, and used by those communications devices even without training them separately.

Figure 3:
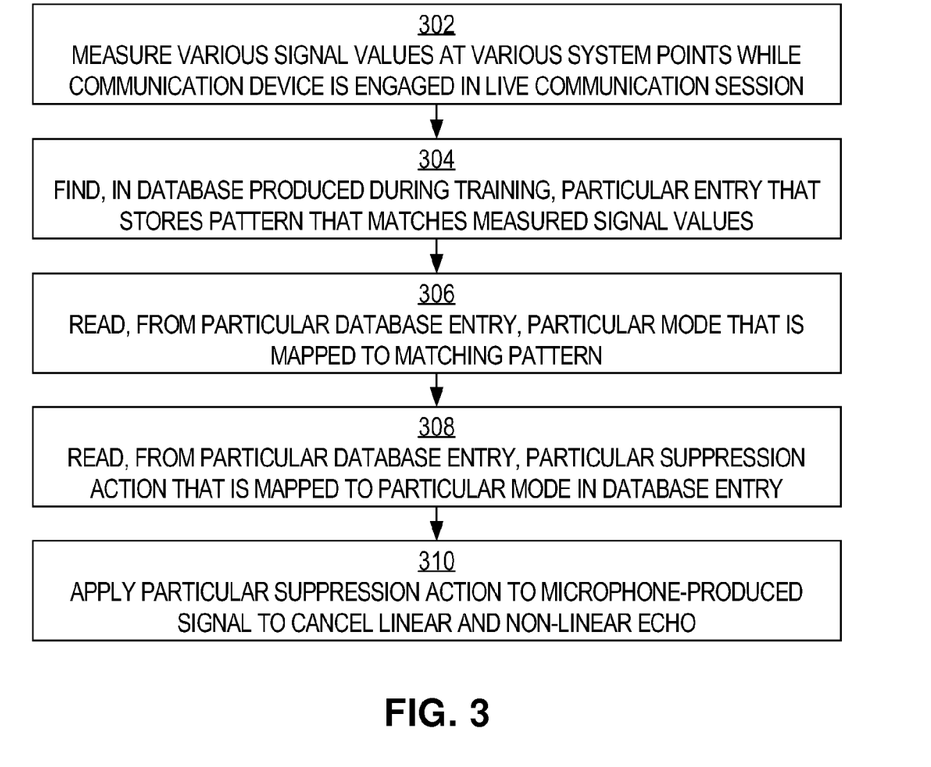
FIG. 3 is a flow diagram that illustrates an example technique for automatically applying suppressive actions to portions of microphone-produced signals based on real-time measured signal patterns that match signal patterns previously learned during a training phase, according to an embodiment of the invention.

FIG. 3 is a flow diagram that illustrates an example technique for automatically applying suppressive actions to portions of microphone-produced signals based on real-time measured signal patterns that match signal patterns previously learned during a training phase, according to an embodiment of the invention. In block 302, while the communications device is participating in an actual real-time communication session, involving a live user of the communications device using the device to communicate with a far end user, pattern classifier 116 reads various signals at various points in the system shown in FIG. 1 in order to classify a pattern. For example, pattern classifier 116 may read at least (a) reference signal 104, which represents far end voice 102, (b) the "raw" signal produced by microphone 108 prior to any echo cancellation being performed on that signal, (c) the signal produced by the output of echo canceller 112 (after subtraction of reference signal 104 has been performed on the microphone-produced signal, as discussed above), and (d) the signal produced by the first pass of residual echo suppressor 114. In an alternative embodiment, pattern classifier 116 reads signals at all points in the system: at the input and output of each module in the system. Together, the combination of signal values, potentially measured at each of several instants during a window of time, forms the pattern.

In block 304, pattern classifier 116 finds, in the database stored on the communications device, a particular database entry that stores a particular pattern that most closely matches the signal pattern measured in block 302.

In block 306, pattern classifier 116 reads, from the database entry found in block 304, the mode that is mapped to the particular matching pattern. For example, pattern classifier 116 may read, from the database entry, that the current mode is the double-talk mode that is characterized by a particular set of frequency-by-volume distribution samples for far end voice 102 and a particular set of frequency-by-volume distribution samples for local voice 110. For another example, pattern classifier 116 may read, from the database entry, that the current mode is simply either "echo only" or "local voice only." Pattern classifier 116 determines that the communications device is currently operating in this communications mode.

In block 308, pattern classifier 116 reads, from the database entry found in block 304, the specified suppression action that is mapped to the mode determined in block 306. As is discussed above, the suppression action may specify frequency ranges and/or blocks of frequency-by-volume fields that should be suppressed.

In block 310, echo gate 122 (driven by pattern classifier 116) applies the suppression action to the microphone-produced signal in order to cancel echo, including non-linear echo, at least partially. The suppression action is performed in real-time during the conversation between the communications device's user and the person on the far end of the communications channel.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
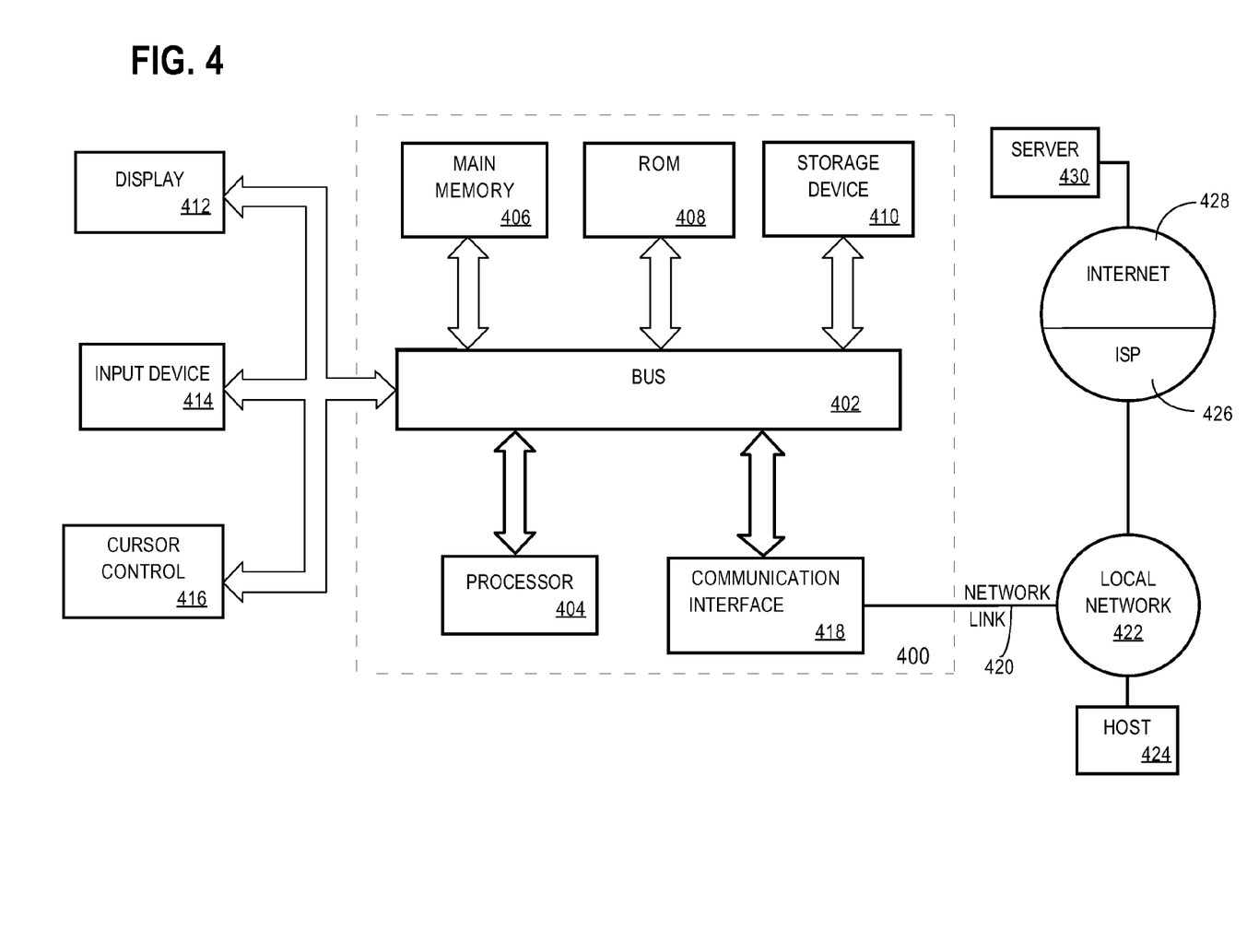
FIG. 4 is a block diagram of a computer system according to an embodiment of the invention.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    simulating a far end voice and a local voice to a communications device;
    measuring signal values at various points in a system of the communications device;
    automatically learning, based on the signal values, that the signal values indicate that the communications device is operating in a particular communication mode of a plurality of communication modes; and
    storing, on a non-transitory computer-readable medium, a mapping between the signal values and the particular communication mode.

2. The method of claim 1, further comprising:
    storing, on the non-transitory computer-readable medium, a mapping between the particular communication mode and a particular suppression action.

3. The method of claim 2, further comprising:
    applying the particular suppression action to a microphone-produced signal to produce an echo-filtered signal.

4. The method of claim 2, wherein the particular suppression action specifies that a particular range of frequencies is to be suppressed in a signal.

5. The method of claim 2, wherein the particular suppression action specifies that a particular range of volumes is to be suppressed in a signal.

6. The method of claim 2, wherein the particular suppression action specifies that a particular range of volumes occurring within a particular range of frequencies is to be suppressed in a signal.

7. The method of claim 2, wherein the particular suppression action specifies that both (a) a first range of volumes occurring within a first range of frequencies and (b) a second range of volumes occurring within a second range of frequencies is to be suppressed in a signal, wherein the first range of volumes differs from the second range of volumes, and wherein the first range of frequencies differs from the second range of frequencies.

8. The method of claim 1, wherein measuring the signal values at various points in the system of the communications device comprises measuring a reference signal which represents sound produced by the far end voice.

9. The method of claim 1, wherein measuring the signal values at various points in the system of the communications device comprises measuring a raw signal produced by a microphone of the device prior to any echo cancellation being performed on the raw signal.

10. The method of claim 1, wherein measuring the signal values at various points in the system of the communications device comprises measuring a signal produced as output of an echo canceller that subtracts a far end voice-representing reference signal from a microphone-produced signal.

11. The method of claim 1, wherein measuring the signal values at various points in the system of the communications device comprises measuring a signal produced by a first pass of an echo suppressor that is designed to suppress at least a portion of a microphone-produced signal based at least in part on the particular communication mode.

12. The method of claim 1, wherein the plurality of communication modes includes at least an "echo only" mode and a "local voice only" mode.

13. The method of claim 1, wherein the plurality of communication modes includes at least (a) a first mode, in which the far end voice is present and the local voice is absent, and (b) a second mode, in which the far end voice is absent and the local voice is present.

14. The method of claim 1, wherein the plurality of communication modes includes one or more modes in which both a far end voice and a local voice are concurrently active.

15. The method of claim 14, wherein each mode of the one or more modes is characterized by at least two sets of frequency-by-volume distribution samples.

16. The method of claim 14, wherein a particular mode of the one or more modes is characterized by (a) a first set of frequency-by-volume distribution samples that reflects multiple samples of the far voice over a particular time interval and (b) a second set of frequency-by-volume distribution samples that reflects multiple samples of the local voice over the particular time interval.

17. The method of claim 1, further comprising:
    during a live conversation in which the communications device is being used, measuring second signal values at the various points in the system of the communications device;
    locating, on the non-transitory computer-readable medium, a particular pattern that matches the second signal values;

reading a second communication mode that is mapped to the particular pattern on the non-transitory computer-readable medium; and determining, in response to said reading, that said communications device is currently operating in the second communication mode.

18. The method of claim 17, further comprising:

applying, to a signal produced by a microphone of the communications device, a particular suppression action that is selected based on the second communication mode;

wherein the particular suppression action removes non-linear echo from the signal produced by the microphone of the communications device.

19. A method comprising:

during a real communication session in which a communications device is being used, measuring signal values at various points in a system of the communications device;

locating, in a database, a database entry that specifies a particular pattern that (a) matches the signal values and (b) was stored in the database during a previous training phase using a machine-learning technique that associated signal patterns with communication modes;

reading, from the database entry, a particular communication mode that is associated with the particular pattern; and modifying, in a manner that is selected based on the particular communication mode, a signal produced by a microphone of the communications device during the communication session.

20. The method of claim 19, wherein modifying the signal produced by the microphone comprises either (a) suppressing the microphone-produced signal entirely or (b) preventing the microphone-produced signal from being suppressed even partially.

21. The method of claim 19, wherein measuring the signal values at various points in the system of the communications device comprises:

measuring a reference signal which represents sound produced by a person other than a user of the communications device;

measuring a signal representing sound received by a microphone of the device, including non-linear echo;

measuring a signal produced as output of an echo canceller that subtracts the reference signal from the microphone-received-sound-representing signal; and measuring a signal produced by a first pass of an echo suppressor that is designed to suppress at least a portion of a signal based at least in part on the particular communication mode.

22. A method comprising:

simulating a far end voice and a local voice to a communications device;

measuring signal values at various points in a system of the communications device;

automatically learning, based on the signal values, that the signal values indicate that the communications device is operating in a particular communication mode of a plurality of communication modes;

storing, on a non-transitory computer-readable medium, a mapping between the signal values and the particular communication mode;

storing, on the non-transitory computer-readable medium, a mapping between the particular communication mode and a particular suppression action;

applying the particular suppression action to a microphone-produced signal to produce an echo-filtered signal;

wherein the particular suppression action specifies that both (a) a first range of volumes occurring within a first range of frequencies and (b) a second range of volumes occurring within a second range of frequencies is to be suppressed in a signal, wherein the first range of volumes differs from the second range of volumes, and wherein the first range of frequencies differs from the second range of frequencies;

wherein measuring the signal values at various points in the system of the communications device comprises: (1) measuring a reference signal which represents sound produced by a person other than a user of the communications device, (2) measuring a signal representing sound received by a microphone of the device, including non-linear echo, (3) measuring a signal produced as output of an echo canceller that subtracts the reference signal from the microphone-received-sound-representing signal, and (4) measuring a signal produced by a first pass of an echo suppressor that is designed to suppress at least a portion of a signal based at least in part on the particular communication mode;

wherein the plurality of communication modes includes one or more modes in which both the far end voice and the local voice are concurrently active;

wherein each mode of the one or more modes is characterized by at least two sets of frequency-by-volume distribution samples;

wherein a particular mode of the one or more modes is characterized by (i) a first set of frequency-by-volume distribution samples that reflects multiple samples of the far voice over a particular time interval and (ii) a second set of frequency-by-volume distribution samples that reflects multiple samples of the local voice over the particular time interval.

23. One or more non-transitory storage media storing instructions which, when executed by one or more computing devices, cause performance of a method comprising:

playing, to a communications device, training data that includes (a) audio data representing a voice of a person other than a user of the communications device and (b) audio data representing a voice of a user of the communications device;

while playing the training data to the communications device, measuring both (1) first signals that represent sound from which echo has been cancelled and (2) second signals that represent sound from which echo has not yet been cancelled;

wherein the first signals and second signals form a set of signals;

associating the set of signals with a particular communications mode that is specified in the training data; and storing, in a database on the communications device, a mapping between the set of signals and the particular communication mode.

24. The one or more non-transitory storage media of claim 23, wherein the instructions, when executed by the one or more computing devices, cause performance of a method further comprising:

selecting, from a plurality of suppression actions, a particular suppression action that corresponds to the particular communication mode; and applying the particular suppression action to remove non-linear echo from a signal representing sound received by a microphone of the communications device;

said sound including sound produced by a loudspeaker of the communications device.

25. A device comprising:

a microphone;

a loudspeaker; and an echo gate that (a) measures a first signal received by the device during a training phase, (b) measures a second signal produced by the microphone during the training phase, (c) associates the first and second signal with a particular communication mode during the training phase, (d) determines, outside of the training phase, and based on a plurality of signals matching the first and second signals, that the device is currently operating in the particular communication mode, and (e) suppresses one or more elements of a third signal produced by the microphone outside of the training phase, thereby removing, from the third signal, non-linear echo produced by the loudspeaker outside of the training phase.

* * * * *